Oct. 14, 1930.   J. K. BRODERICK   1,778,208
CAMERA
Filed March 15, 1926

Inventor:
John K. Broderick,
by Rippey & Kingsland
His Attorneys.

Patented Oct. 14, 1930

1,778,208

UNITED STATES PATENT OFFICE

JOHN K. BRODERICK, OF KIRKWOOD, MISSOURI

CAMERA

Application filed March 15, 1926. Serial No. 94,725.

This invention relates to improvements in cameras, and consists of the novel construction hereinafter disclosed.

An object of the invention is to provide in a camera means whereby exposures of different dimensions may be made on films, combined with means for accurately centering films for the different dimensioned exposures.

Figure 1:
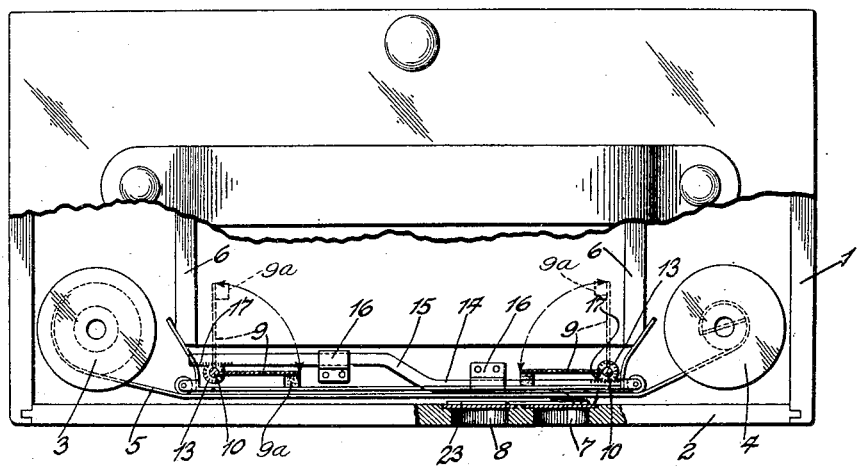
Figure 2:
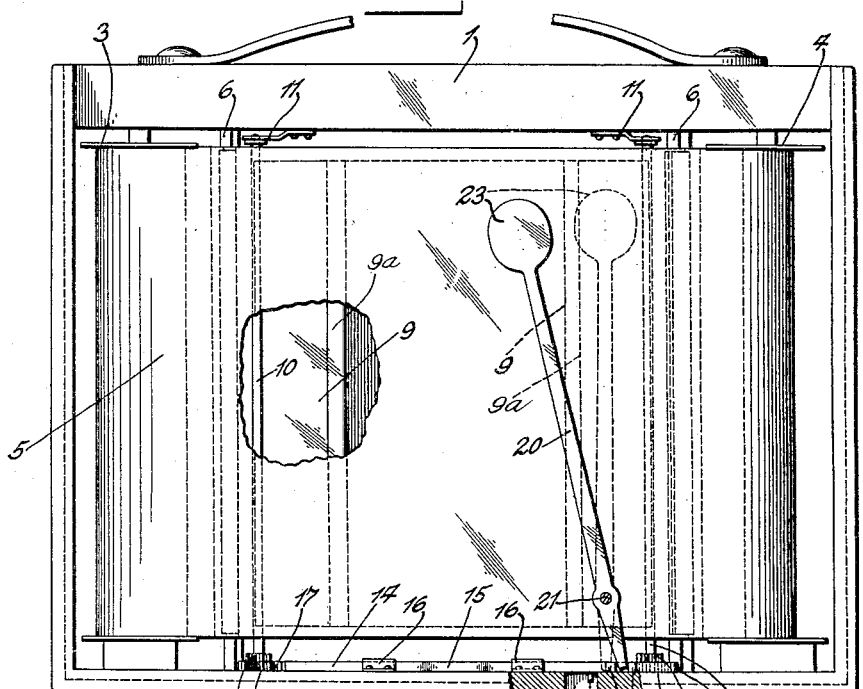
Figure 3:
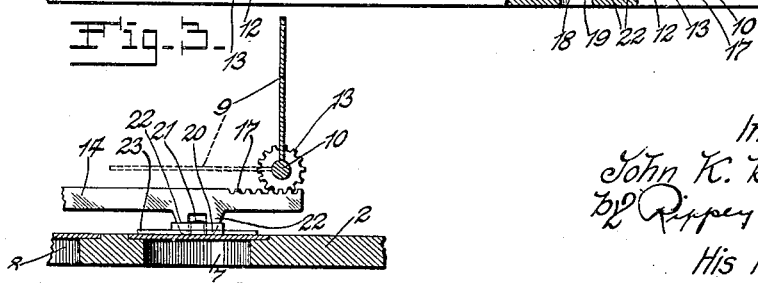

Advantageous details of the construction will be apparent from the following detailed description of the invention, taken in connection with the accompanying drawing in which Fig. 1 is a view with a portion of the box of the camera broken away to illustrate the mechanism in plan view;

Fig. 2 is a view with the back wall of the camera box removed to illustrate the invention in elevation; and Fig. 3 is a detail view illustrating certain parts of the mechanism.

In the embodiment of the invention illustrated in the drawing, the mechanism is shown incorporated in a film camera which includes a box or case 1 of any suitable form, the back wall 2 of which is made removable for the insertion and removal of the film. The film is carried as usual on spools 3 and 4 mounted for rotation at opposite ends of the box, the film 5 winding from one spool to the other across a sight opening at the rear of the exposure frame 6. The exposure frame 6 may be equipped with a bellows for focusing the camera or the camera may be made with a permanent frame with the standard focus.

It will be understood that at spaced intervals, the film carries indicia which are exposed through selected ones of the openings 7 and 8 to indicate when the separate areas of the film are centered for exposures. It will, of course, be understood that for films of narrower exposure, the indicia will be closer together than the films for wider exposures. The opening 8 is so disposed as to center the wider exposure films and the opening 7 for centering the narrower exposure films. The setting and adjustment for the centering of the films will be described hereinafter in its relationship to the adjustment of the sight opening for the different width of films.

It will be understood that the back of the exposure frame is open and that the area of the film to be exposed is centered across this opening in preparing the camera for exposure. The narrowing of this exposure opening is accomplished by providing at either side thereof a vertical shutter 9. Each of these shutters is carried by a stem 10, said stems being mounted for pivot movement. The upper end of each stem is carried in a bracket 11 attached to the top wall of the camera box and the lower end is mounted in a socket 12 in the bottom wall of the camera box. Each stem is also provided with a small pinion 13 near its lower end and below the marginal edge of the film. The shutters are arranged to swing outwardly towards the center of the exposure opening from a position parallel with the respective side walls of the exposure frame. The positions assumed by the shutter are clearly indicated in Fig. 1 of the drawing, the inward adjustment being shown in dotted lines in this figure, and the path of movement being indicated by the arrows. Each shutter is provided with a vertical strip $9^a$ of felt or other similar material, so that when swung to position to mask a portion of the film, the strips will contact with the film surface, and exclude light from that area of the film that is masked by the shutters. The shutters are arranged to be operated from the exterior of the camera box so that the adjustment may be effected without exposing the film.

The means for operating the shutters includes a bar 14 having an angular offset 15, said bar being mounted in suitable guideways 16 attached to the bottom wall of the camera box. At the extremities of the bar 14 are racks 17, said racks being arranged on opposite sides of the axes of the pinions 13. In the bottom of the camera box is an opening 18 into which a lug 19 attached to the face of the bar 14 extends, so that the bar may be moved endwise by manual manipulation. It will, of course, be understood that the construction incorporates light excluding seals around the opening 18.

By moving the bar 14 endwise, the shutters are simultaneously moved to either an inward or outward adjustment to narrow or expand the exposure opening at the back of the exposure frame. In order that the film may be properly centered, means are provided for opening and closing the respective ends of the openings 7 and 8 to correspond with the adjustment of the shutters. This is accomplished by a lever 20 pivoted on a pin 21 carried by the back wall of the camera box. The bar 14 near one end carries spaced lugs 22 that project into the plane of the extremity of the lever when the back wall of the camera is in place, the lower end of the lever operating between the lugs so that the lever will be swung when the bar 14 is moved endwise. The lever 20 carries at its upper end a shutter 23 that extends over the side openings of the windows 7 and 8 selectively as the mechanism is adjusted.

In Fig. 2, the adjustment for the narrower film exposure is shown in full lines, and that for the wider film exposure is shown in dotted lines. That is to say, when the wide film exposure is to be made, the opening 7 is closed and the film is centered by centering the numbers or other indicia on the film through the opening 8, and when the narrower film exposure is used, the opening 8 is closed and the film is centered through the opening 7.

From the foregoing, it will be understood that a camera constructed in accordance with the invention may be used for wide or narrow exposure as desired by the simple adjustment of the device described.

I am aware that the invention may be modified in certain particulars without departure from the spirit and scope thereof; but what I claim and desire to secure by Letters Patent is:

1. In a camera, the combination of an exposure frame, shutters for narrowing or extending the area of surface of the film to be exposed, a member provided with a pair of spaced sight openings for centering the film, a member operatively connected with the shutters, said member operating across the sight openings, and connections between the shutters and said member whereby said member is moved to open or close said sight openings responsive to the movement of the shutters.

2. In a camera, the combination with an exposure frame, pivoted light proof shutters arranged one at each side of said frame adapted to swing toward and away from the exposure area, light excluding means carried by said shutters and extending inwardly toward the film, an actuator, and gear connections between the actuator and said shutters whereby the shutters are moved toward and away from each other.

3. In a camera having a pair of spaced sight openings, the combination of an exposure frame, shutters pivoted at each side of the exposure frame being of a less aggregate width than the width of the frame whereby the area of the surface of the film to be exposed may be extended or narrowed, a lever operatively connected with the shutters, said lever being provided with a disc operating across said sight openings, a film holding device for moving a film across the exposure frame, a film in said device provided with corresponding indicia for centering said film, and connections between the shutters and said lever whereby said lever is moved to open or close a respective one of said sight openings responsive to the movement of the shutters.

JOHN K. BRODERICK.